(12) United States Patent
Waffaoui et al.

(10) Patent No.: US 9,430,729 B2
(45) Date of Patent: Aug. 30, 2016

(54) BROADBAND PROGRESSIVE TAG

(75) Inventors: Rachid El Waffaoui, Eindhoven (NL); Christian Weidinger, Graz (AT)

(73) Assignee: NXP B.V., Eindhoven (NL)

( * ) Notice: Subject to any disclaimer, the term of this patent is extended or adjusted under 35 U.S.C. 154(b) by 535 days.

(21) Appl. No.: 13/485,655

(22) Filed: May 31, 2012

(65) Prior Publication Data

US 2013/0321130 A1 Dec. 5, 2013

(51) Int. Cl.
*H04Q 5/22* (2006.01)
*G06K 19/07* (2006.01)
*G06K 7/01* (2006.01)

(52) U.S. Cl.
CPC ............. *G06K 19/0726* (2013.01); *G06K 7/01* (2013.01)

(58) Field of Classification Search
None
See application file for complete search history.

(56) References Cited

U.S. PATENT DOCUMENTS

| | | | |
|---|---|---|---|
| 5,235,335 A | | 8/1993 | Hester et al. |
| 5,446,447 A | | 8/1995 | Carney et al. |
| 5,491,715 A | * | 2/1996 | Flaxl .............................. 375/344 |
| 5,847,662 A | * | 12/1998 | Yokota et al. ............. 340/10.34 |
| 6,317,027 B1 | * | 11/2001 | Watkins ....................... 340/10.1 |
| 6,353,406 B1 | * | 3/2002 | Lanzl et al. .................. 342/118 |
| 2002/0158696 A1 | * | 10/2002 | Staszewski et al. .......... 331/100 |
| 2005/0104790 A1 | * | 5/2005 | Duron ........................... 343/745 |
| 2006/0071793 A1 | | 4/2006 | Pesavento |
| 2007/0171065 A1 | * | 7/2007 | Ku et al. ..................... 340/572.1 |
| 2009/0160648 A1 | * | 6/2009 | Rokhsaz ..................... 340/572.1 |
| 2010/0039267 A1 | | 2/2010 | Wall et al. |
| 2010/0201496 A1 | * | 8/2010 | Schillmeier et al. ........ 340/10.4 |
| 2011/0241750 A1 | | 10/2011 | Hill |
| 2011/0248832 A1 | | 10/2011 | El Waffaoui et al. |

FOREIGN PATENT DOCUMENTS

| GB | 2465223 A | 5/2010 |
|---|---|---|
| KR | 20050065170 A | 6/2005 |

OTHER PUBLICATIONS

Extended European Search Report for Patent Appln. No. 13160168.4 (Sep. 30, 2015).

* cited by examiner

*Primary Examiner* — Curtis King

(57) ABSTRACT

In one embodiment, an RFID apparatus is provided, which includes an input circuit that has an input impedance used for receiving RF signals. An RF-signal converter provides an apparatus-operating power signal in response to receiving the RF signals. An impedance circuit provides and selects impedance values in response to at least one select signal provided by a state-machine logic circuit. The state-machine logic circuit provides the select signal(s) in response to the apparatus-operating power signal for selecting the impedance values and therein permit the input impedance to be changed for tuning the RFID apparatus.

19 Claims, 13 Drawing Sheets

BROADBAND PROGRESSIVE TAG

Radio-frequency identification (RFID) tag and reader systems may operate over a wide range of frequencies, including low-frequency (LF) applications, high-frequency (HF) applications, and ultra-high-frequency applications (UHF). Depending on their application, various environmental factors can cause an RFID tag to become detuned, thereby modifying the operating frequency necessary for quality communications and potentially affecting the received power and the read range of the RFID tag.

In such RFID tags, power matching between a passive tag and an integrated circuit contained therein depends on the input impedance of a RF-to-DC converter and an antenna. For example, an RFID tag antenna, in the presence of metals, liquids, materials, and/or in proximity with other tags, may experience detuning due to absorption from the metals, liquids or materials or parasitic capacitance provided by the boundaries conditions from other tags. Detuning can also be caused by the spread on the capacitance of the label and of the tag IC, and the spread on the inductance of the label due to processing and/or packaging.

Aspects of the instant disclosure are directed towards providing passive RFID apparatuses that compensate for detuning due to any of a variety of factors, for example, a static environment, integrated circuit process spread, label spread, and detuning due to the close proximity to other tags.

In one embodiment, an RFID apparatus is provided, which includes an input circuit that has an input impedance used for receiving RF signals. In response to receiving the RF signals, an RF-signal converter provides an apparatus-operating power signal. The RFID apparatus additionally includes an impedance circuit that provides and selects impedance values in response to at least one select signal provided by a state-machine logic circuit. The state-machine logic circuit provides the select signal(s) in response to the apparatus-operating power signal for selecting the impedance values and therein permit the input impedance to be changed for tuning the RFID apparatus.

Aspects of the instant disclosure are also directed towards RFID apparatuses having an input impedance which is susceptible to change due to environmentally-based impedance influences. These apparatuses include an input circuit having an input impedance used for receiving RF signals. In response to receiving the RF signals, an RF-signal converter is arranged to provide an apparatus-operating power signal. In response to at least one select signal provided by a state-machine logic circuit, a capacitance circuit provides and selects capacitance values. The state-machine logic circuit is configured to provide the select signal(s), in response to the apparatus-operating power signal, for selecting the impedance values and permitting the input impedance to be changed by tuning the apparatus in order to compensate for the environmentally-based impedance influences. Aspects of the instant disclosure are additionally directed towards methods of using the apparatuses described herein.

Aspects of the instant disclosure are also directed towards methods that include providing an RFID circuit with an input circuit having an input impedance used for receiving RF signals, and providing an RF-signal converter for providing operating power in response to receiving the RF signals. An impedance circuit is used to provide and select impedance values in response to at least one select signal. Additionally, a state-machine logic circuit, responsive to the RF-signal converter, is used by providing operating power during a start-up mode, to generate at least one select signal that selects the impedance values to change the input impedance, and thereby tuning the apparatus.

The above discussion is not intended to describe each embodiment or every implementation. The figures and following description also exemplify various embodiments.

Various example embodiments may be more completely understood in consideration of the following detailed description in connection with the accompanying drawings, in which.

Figure 1A:
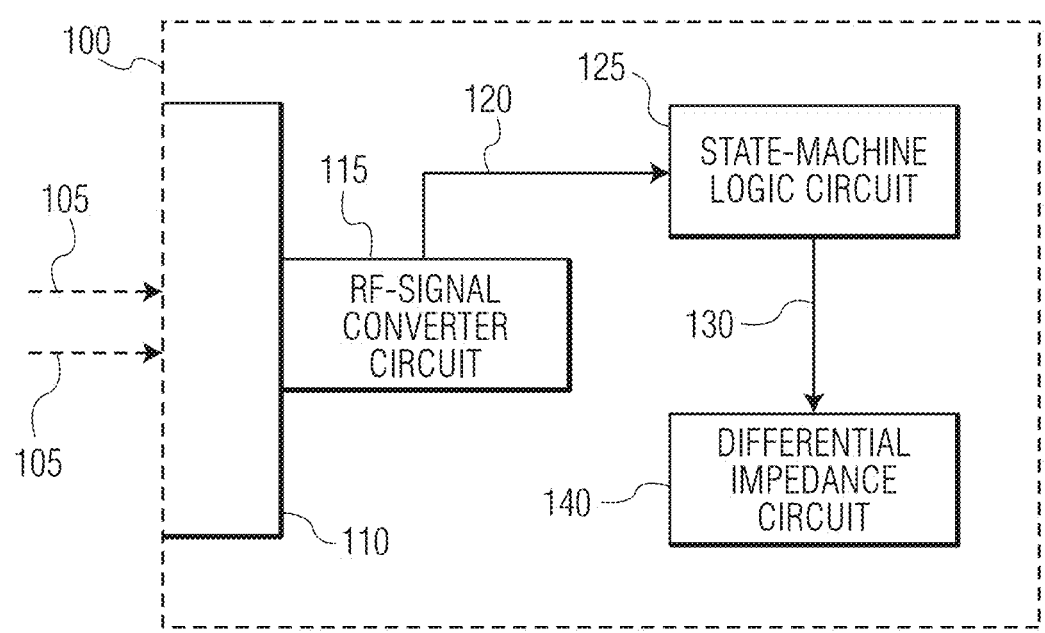
FIG. 1A shows an example block diagram of RFID apparatuses of example embodiments consistent with the instant disclosure.

While the disclosure is amenable to various modifications and alternative forms, examples thereof have been shown by way of example in the drawings and will be described in detail. It should be understood, however, that the intention is not to limit the disclosure to the particular embodiments shown and/or described. On the contrary, the intention is to cover all modifications, equivalents, and alternatives falling within the spirit and scope of the disclosure.

Embodiments of the instant disclosure are directed towards an RFID apparatus, and methods of using the apparatus, which includes an input circuit, an impedance circuit, and a state-machine logic circuit configured and arranged to permit changing of the input impedance of the RFID apparatus. More specific embodiments have been found to be particularly advantageous for such RFID applications in which the converter is an RF-DC converter, where the DC-component is used to provide a power signal. In certain of these embodiments, the input circuit of the RFID apparatus has an input impedance that is used for receiving RF signals. In certain embodiments, the input impedance is a capacitance which is tuned to be independent of RF-modulation parameters. In response to receiving the RF signals, the RF-signal converter provides an apparatus-operating power signal. Further, the impedance circuit (e.g., a bank of capacitance circuits) provides, and selects, impedance values in response to at least one select signal. The state-machine logic circuit provides the select signal(s), in response to the apparatus-operating power signal provided by the RF-signal converter, for selecting the impedance values—therein permitting the input impedance to be changed for tuning the RFID apparatus. In certain embodiments, the select signal(s) includes a first signal and another signal. In those instances, the logic circuit of the RFID apparatus operates the state-machine logic circuit for a first mode in which the first signal is applied, and for another mode in which another signal is applied.

In certain other embodiments, the impedance circuit includes a bank of capacitance circuits, each of which provides a capacitance value in response to the select signal(s). Additionally, the bank of capacitance circuits in other embodiments is unit-selectable, where each unit-selectable capacitance circuit provides a capacitance value in response to select signal(s).

Impedance circuits, consistent with the instant disclosure, include a selectable capacitance circuit (having a plurality of non-volatile switches) in certain embodiments. In certain instances, the plurality of non-volatile switches are MOS-device switches in which unit capacitance is changed by controlling a threshold voltage of at least one MOS device from the plurality of nonvolatile MOS-device switches. Additionally, the impedance circuit can be further configured for programming as a resonance capacitor during use of the RFID apparatus.

Additionally, the impedance circuit of various embodiments of the RFID apparatus includes a selectable capacitance circuit having a plurality of nonvolatile MOS-device switches in which unit capacitance is changed by controlling a threshold voltage of at least one MOS device from the plurality of nonvolatile MOS-device switches. Further, in other specific embodiments, the impedance circuit will include a bank of unit-selectable capacitance circuits which provides a default capacitance value from which the input impedance is changed to tune the apparatus. Various embodiments of the impedance circuit is further provided with a selectable capacitance circuit having a plurality of nonvolatile MOS-device switches in which unit capacitance is control by affecting a threshold voltage of at least one MOS device from the plurality of nonvolatile MOS-device switches.

RFID apparatuses, in certain embodiments, can also include a charge pump circuit that assists the RF-signal converter in providing an apparatus-operating power signal in response to receiving the RF signals. Further, in other embodiments, an RFID apparatus can include a charge pump that, in addition to assisting the RF-signal converter in providing an apparatus-operating power signal in response to the RF signals, the assisting occurs during the start-up mode of operating the apparatus. In embodiments of the RFID apparatus where the charge pump assists during the start-up mode of operating the apparatus, the charge pump can be arranged such that it will not assist the RF-signal converter during a period after the start-up mode of operating the apparatus.

RF signals usually carry data. Thus, an RF signal received by an RFID apparatus, consistent with the instant disclosure, and prior to the signal being converted, can include both a data signal and a power signal for powering a passive RFID tag. Additionally, as the signal can include power and data signals, the power signal can be used, for example, as a back-up source of power to supply an active RFID tag.

Additionally, certain embodiments of the RFID apparatus include a logic circuit that operates the state machine for a first mode and another mode. In the first mode, a first voltage is applied to change a threshold voltage for changing an impedance value of a selectable circuit in the impedance circuit. When operating in another mode, another voltage is applied for changing of an impedance value in the impedance circuit.

Aspects of the instant disclosure are also directed towards RFID apparatuses, which have an input impedance that is susceptible to change due to environmentally-based impedance influences. The RFID apparatuses include an input circuit, which has an input impedance that is used for receiving RF signals. Additionally, an RF-signal converter is included in the RFID apparatuses, which provides an apparatus-operating power signal (in response to receiving the RF signals). Further, the RFID apparatuses will have a capacitance circuit that provides (and selects) a capacitance value, in response to at least one select signal. The RFID apparatuses also include a state-machine logic circuit that provides the select signal(s), in response to the apparatus-operating power signal, for selecting the impedance values, and therein permits the input impedance to be changed by tuning the apparatus in order to compensate for the environmentally-based impedance impedances.

The capacitance circuit, in certain more specific embodiments, includes a bank of capacitors, each of which provides a capacitance value in response to at least one select signal. In other embodiments, the capacitance circuit also provides a default capacitance value from which the input impedance is changed to tune the apparatus.

A passive RFID tag apparatus can be constructed using input circuitry, an RF-signal converter, an impedance circuit, and a logic circuit, consistent with aspects of the instant disclosure.

Adjusting a programmable input impedance (or capacitance) in an RFID apparatus can compensate for detuning. This input capacitance is signal independent such that modulation and demodulation will not impact or alter the input capacitance, as would be the case if a varicap diode was used. Non-volatile switches can be used in adjusting the input capacitance. In this manner, the switches will not require a large amount of DC voltage to reduce the on-resistance of the switches. Use of the non-volatile switches alleviates a "start-up problem" that is not suitable for RF powered circuits (passive systems). Without using the non-volatile switches in the capacitors bank, the start-up output of an RF-to-DC converter is zero. As a result, the resonant circuit is tuned at high frequencies. The power received by the rectifier is not sufficient to turn the switches of the capacitors bank on.

Turning now to the Figures, FIG. 1A shows an example embodiment of an RFID apparatus 100, consistent with aspects of the instant disclosure. The RFID apparatus 100 includes an input circuit 110 that has an input impedance used for receiving RF signals 105. In response to receiving the RF signals 105, an RF-signal converter 115 provides an apparatus-operating power signal 120 to a state-machine logic circuit 125. An impedance circuit 140 provides and selects impedance values in response to at least one select signal 130 provided by the state-machine logic circuit 125. The state-machine logic circuit 125 provides the select signal(s) 130 in response to the apparatus-operating power signal 120 for selecting the impedance values and therein permit the input impedance to be changed for tuning the RFID apparatus 100.

In certain embodiments, the impedance circuit 140 includes a bank of capacitance circuits. These circuits are shown in further detail below with reference to, for example, FIGS. 3-7, and can include various nonvolatile switches (MOS-type) as shown therein. The bank of capacitance circuits included in the impedance circuit 140 is designed, in certain embodiments, to provide a capacitance value in response to the select signal(s) 130.

Figure 1B:
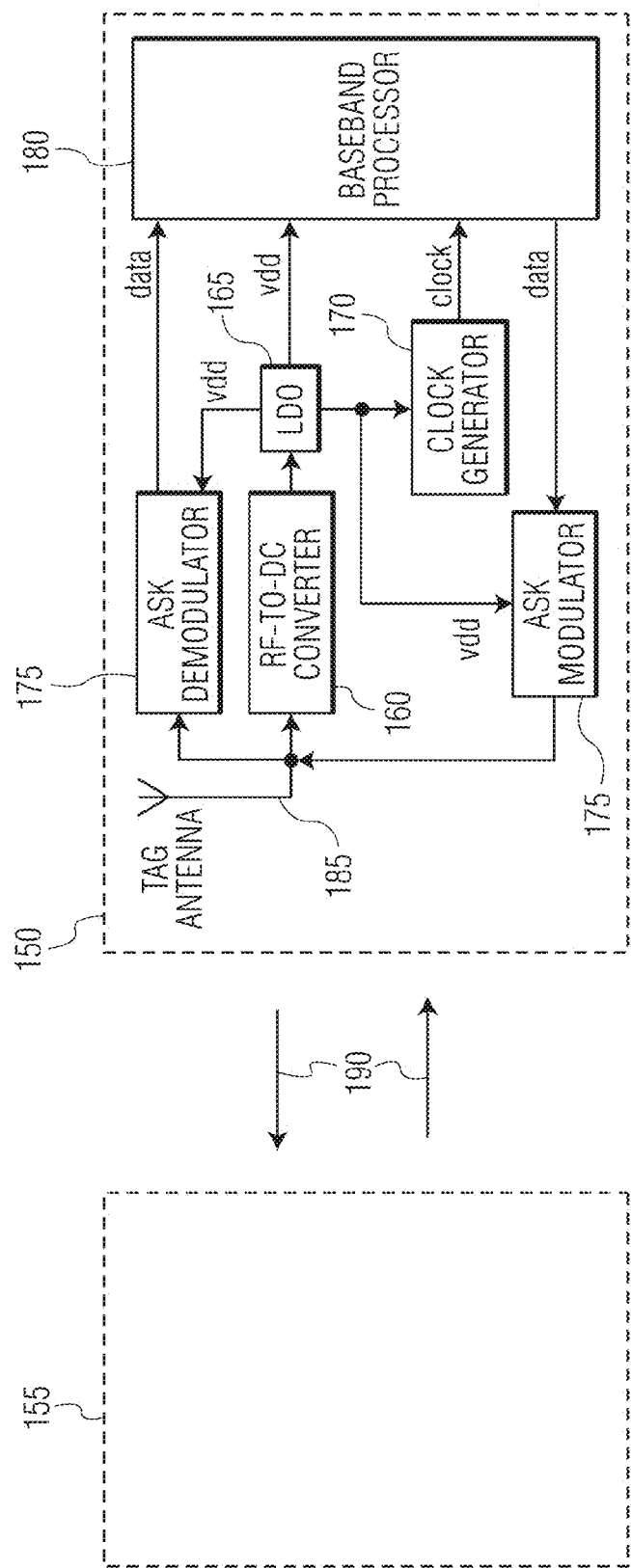
FIG. 1B shows an RFID tag and reader consistent with example embodiments of the instant disclosure

Block 100 of FIG. 1A is shown in FIG. 1B implemented as part of an RFID tag 150. FIG. 1B shows a block diagram of an RFID tag 150 and an RFID reader 155. The RFID tag 150 includes of an RF-to-DC converter 160, a low drop out regulator 165, a clock generator 170, an amplitude-shift keying (ASK) modulator/demodulator 175, a baseband processor 180, and an antenna 185. ASK modulation is a form of modulation that represents a digital signal as variations in the amplitude of a carrier signal. In RFID uses, amplitude ASK modulation is utilized to change the amplitude of RF signals 195 in order to communicate data that is stored in the RFID tag 150. The data stored on the tag, for example in the baseband processor 180, is encoded onto an RF signals 195 through the ASK modulator 175. In this manner, the RFID tag 150 can use the ASK demodulator 175 to decode the data that is sent over the RF signals 195. Other types of modulation (e.g., frequency shift keying (FSK), phase shift keying (PSK)) can also be used to communicate the data on the RF signals.

Figure 2:
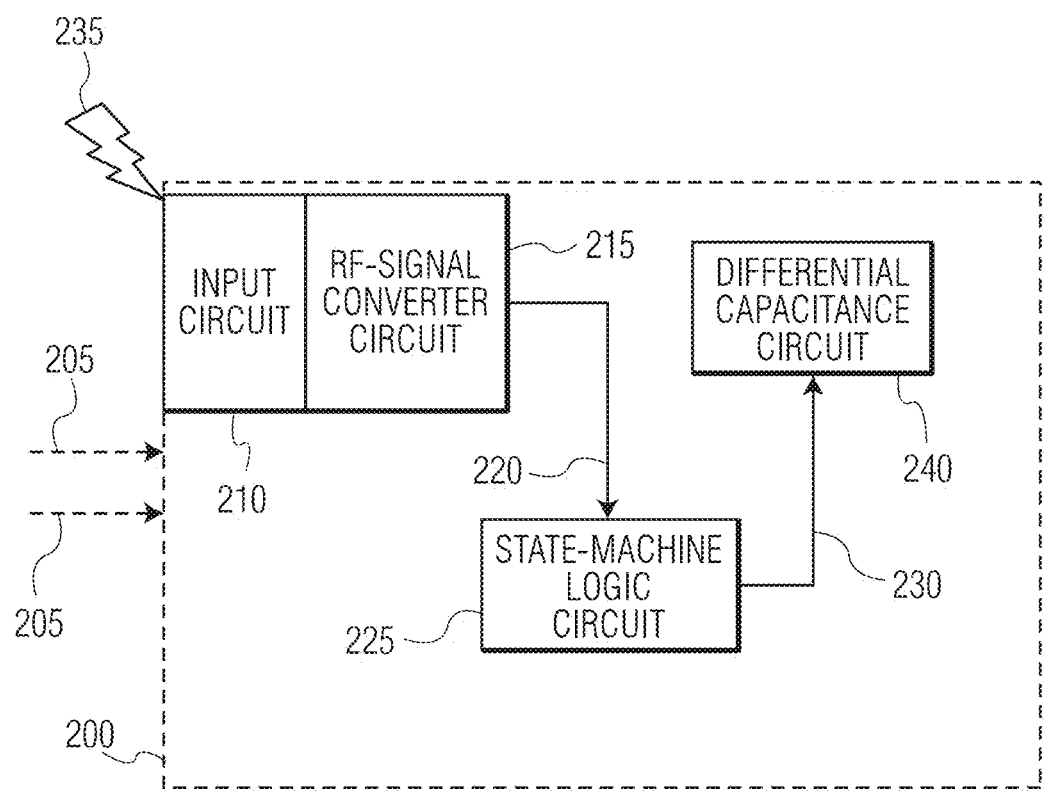
FIG. 2 shows an example block diagram of RFID apparatuses of other example embodiments consistent with the instant disclosure.

FIG. 2 shows an example embodiment of an RFID apparatus 200 having an input impedance that is susceptible to change due to environmentally-based impedance influences 235. The RFID apparatus 200 has an input circuit 210, which has an input impedance that is used for receiving RF signals 205. In response to receiving RF signals 205, an RF-signal converter 215 provides an apparatus-operating power signal 220. A capacitance circuit 240 provides and selects capacitance values in response to at least one select signal 230, which is provided by a state-machine logic circuit 225. The state-machine logic circuit 225 is configured to provide the select signal(s) 230, in response to the apparatus-operating power signal 220, for selecting the impedance values, and permitting the input impedance to be changed by tuning the apparatus 200 in order to compensate for the environmentally-based impedance influences 235.

In certain embodiments, the capacitor circuit 240 includes various nonvolatile switches (MOS-type) as shown therein. The bank of capacitance circuits included in the capacitor circuit 240 are designed, in certain embodiments, to provide a capacitance value in response to the select signal(s) 230. These circuits and switches are shown in further detail below with reference to, for example, FIGS. 3-7.

Figure 3:
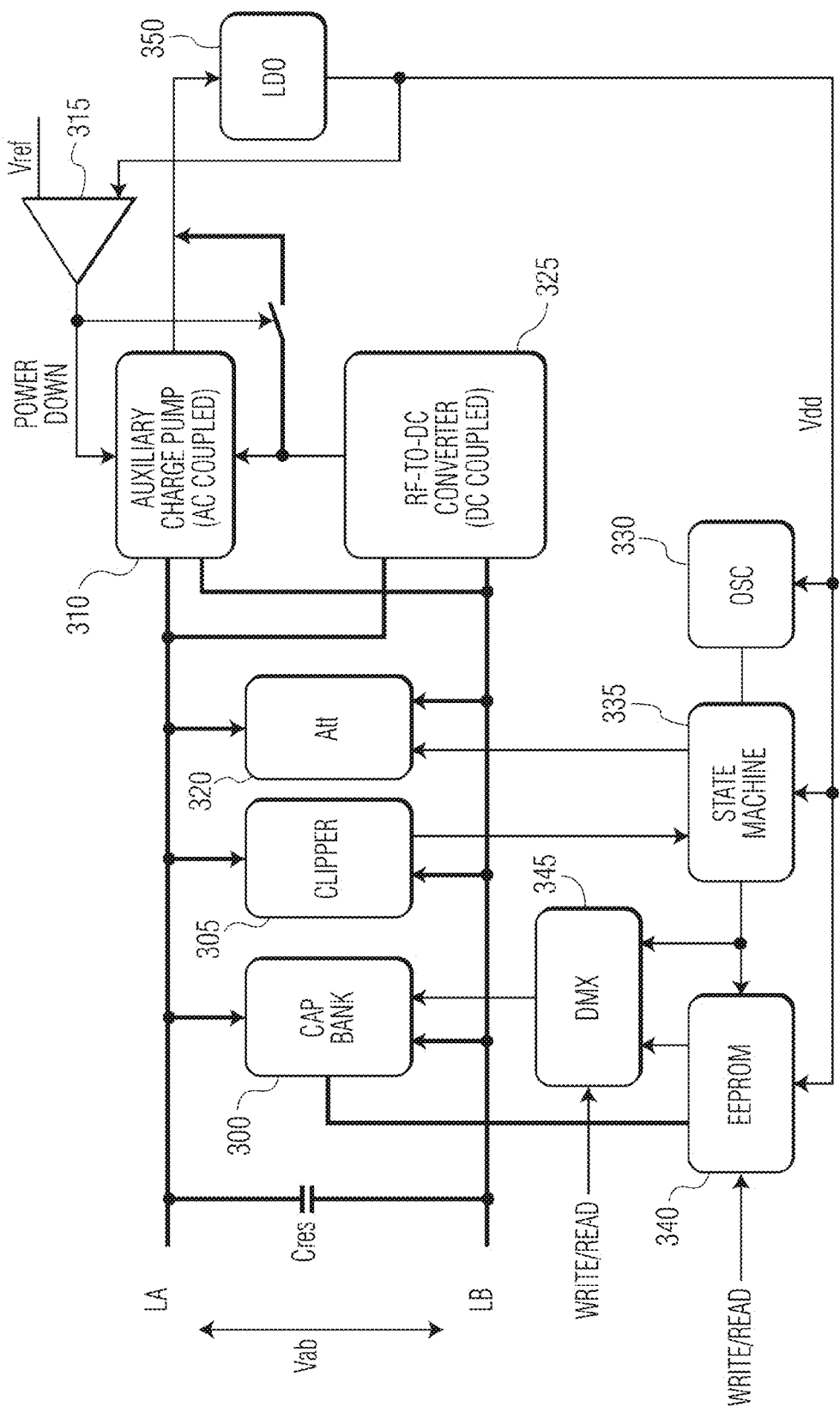
FIG. 3 shows a circuit level diagram of RFID apparatuses, consistent with the instant disclosure.

FIG. 3 shows a circuit level diagram of aspects utilized in the RFID apparatuses described herein. As can be seen in FIG. 3, the capacitor bank 300 (or impedance circuit) is, which is provided with LA and LB signals. The RFID apparatuses can optionally include an auxiliary multi-stage charge pump 310. This charge pump helps to create a higher DC voltage, to overcome the on-resistance of the switches if the input voltage is small. Additionally, the circuit includes a state machine circuit 335, and an attenuator 320 to avoid clipping 305 during the tuning process.

At large tuning ranges of the capacitors bank, adding an auxiliary charge pump 310 might not be sufficient to get the tag started in a read mode. Nonvolatile switches, as discussed in further detail below, are included in the capacitor bank 300 to have these switches on in the absence of the incoming RF signal. An RF-to-DC converter 325 is coupled to the auxiliary charge pump 310 (when present), the capacitor bank 300, and the attenuator 320 to avoid clipping 305.

The circuit shown in FIG. 3 operates in two modes: write mode and read mode. In the write mode, the distance between a tag and a reader should be reduced to provide enough power to the tag. The reader triggers the tuning process by sending a special command to the tag in order to activate the state machine 335. The state machine 335 adjusts the attenuator 320 and the tuning word of the capacitors bank 300 to improve power matching at the input of the tag. The final tuning word is then written in the E2PROM 340. The auxiliary charge pump 310 is not needed during the write mode. In the read mode, the output of E2PROM 340 is connected to the capacitors bank 300. The auxiliary charge pump is turned off once its output has exceeded a given voltage reference. Turning off the auxiliary charge pump during the normal operation of the tag helps to maximize the efficiency of the main rectifier.

The tuning word is stored in the E2PROM 340, and also used to change the threshold of the non-volatile switches used in the capacitors bank 300. To turn a unit capacitance of the capacitors bank off, the threshold voltage of the corresponding switch is increased. To turn a unit capacitance on, the threshold of the corresponding switch is decreased. The nonvolatile switch can be a pMOS or an nMOS. The tuning word stored in the E2PROM 340 is used to change the control gate and drain/source voltages, shown in further detail in FIG. 4, depending on whether the switch should be on or should be off. Also shown in FIG. 3 is a demultiplexer 345, which assists in the write/read modes, an oscillator circuit 330 to provide a signal to the state machine 335, a low-dropout regulator 350 to maintain a stable operating voltage, and a comparator 315 to compare the output of low-dropout regulator 350 to the reference voltage Vref.

Figure 4:
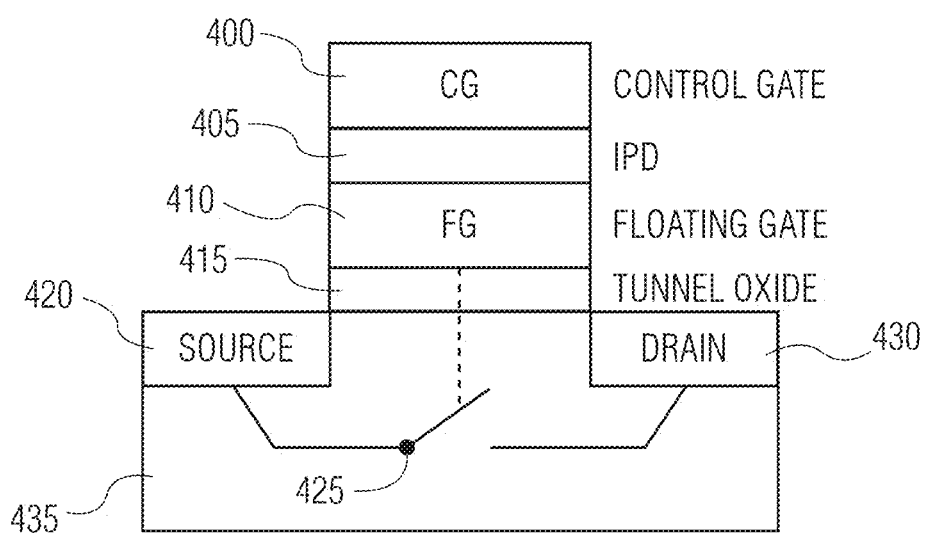
FIG. 4 shows a cross section of a non-volatile switch, included in various embodiments of the instant disclosure.

FIG. 4 shows a cross section of a nonvolatile switch utilized in various embodiments of the instant disclosure. The nonvolatile switch includes a control gate 400, an intepoly dielectric layer 405, a floating gate 410, a tunnel oxide layer 415 stacked on a substrate 435. A source 420 and a drain 430 are controlled by the control gate 400 to turn the switch 425 on or off accordingly.

Figure 5:
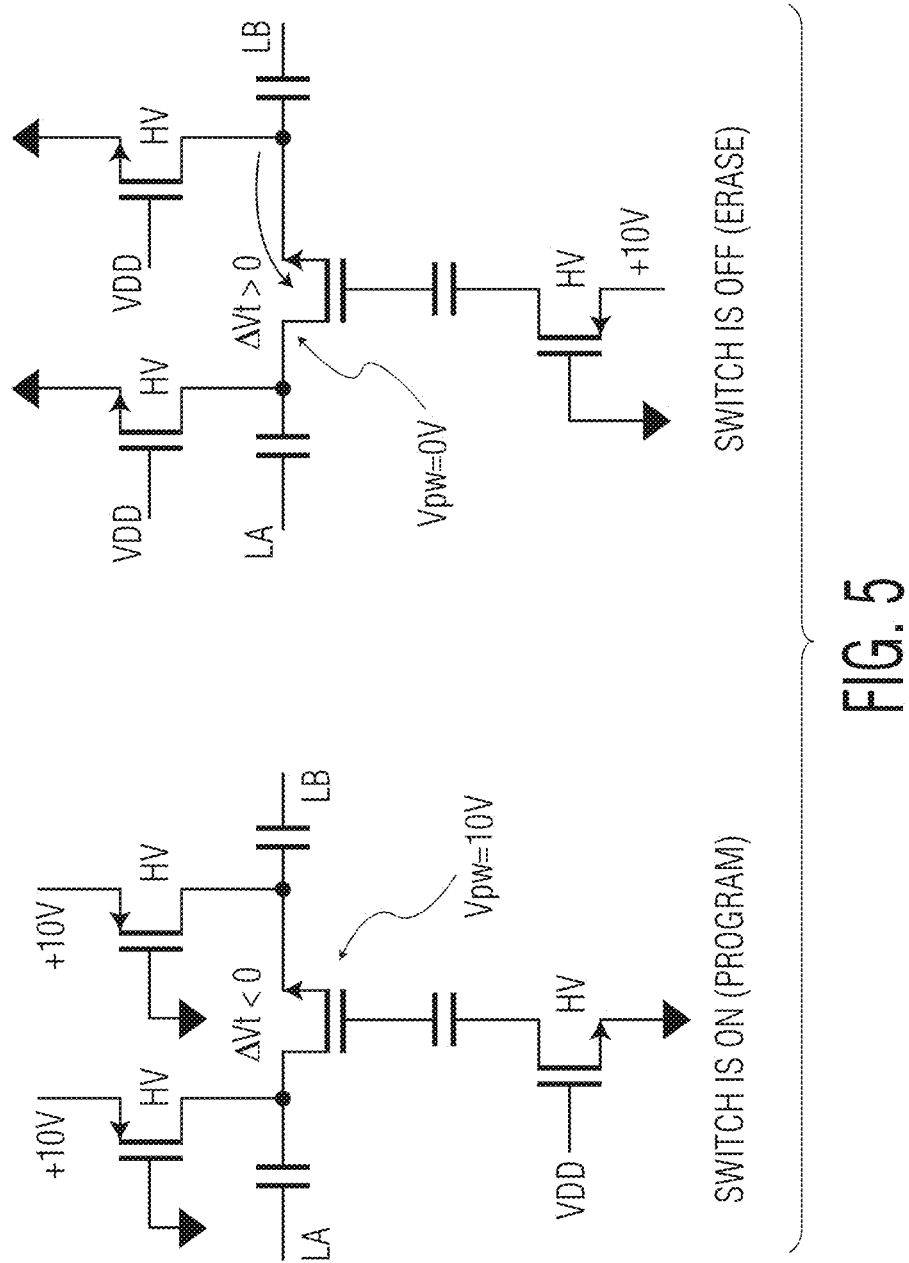
FIG. 5 shows a unit differential capacitor using the non-volatile switch, consistent with the instant disclosure, in a write mode.
Figure 6:
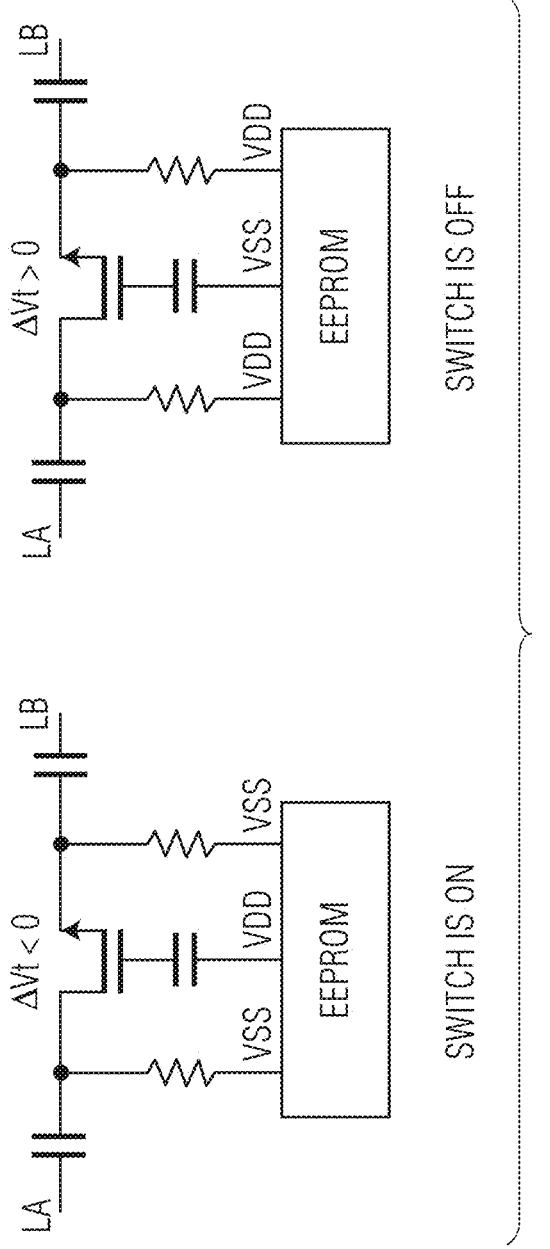
FIG. 6 shows a unit differential capacitor using the non-volatile switch, consistent with the instant disclosure, in a read mode.

An implementation of a circuit with a unit capacitance using an nMOS switch is shown in FIGS. 5 and 6. A similar construction can be implemented with a pMOS switch. The unit capacitance has two modes: a write mode, as shown in FIG. 5, and a read mode, as shown in FIG. 6. The diagram shown in FIG. 5 illustrates that to turn the switch on in a write mode, a high voltage (e.g., >10V) is applied to the source and the drain of the switch. The control gate is forced to ground. This results in a decreased threshold of the nMOS device. Also, as shown in FIG. 5, to turn the switch off in a write mode, a high voltage (e.g., >10V) has to be applied to the control gate of the switch. The drain and the source are forced to ground. This results in an increased threshold voltage.

In a read mode, as shown in FIG. 6, to reduce the on-resistance when the switch is on, the drain/source of the nMOS switch are DC grounded via a high ohmic resistor, while the control gate is biased at VDD. To increase the off-resistance when the switch is off, the drain/source of the nMOS are biased at VDD via a high ohmic resistor, while the control gate is grounded. The tuning word for the switch is stored in the E2PROM, which can also be used to change the threshold of thereof.

Figure 7:
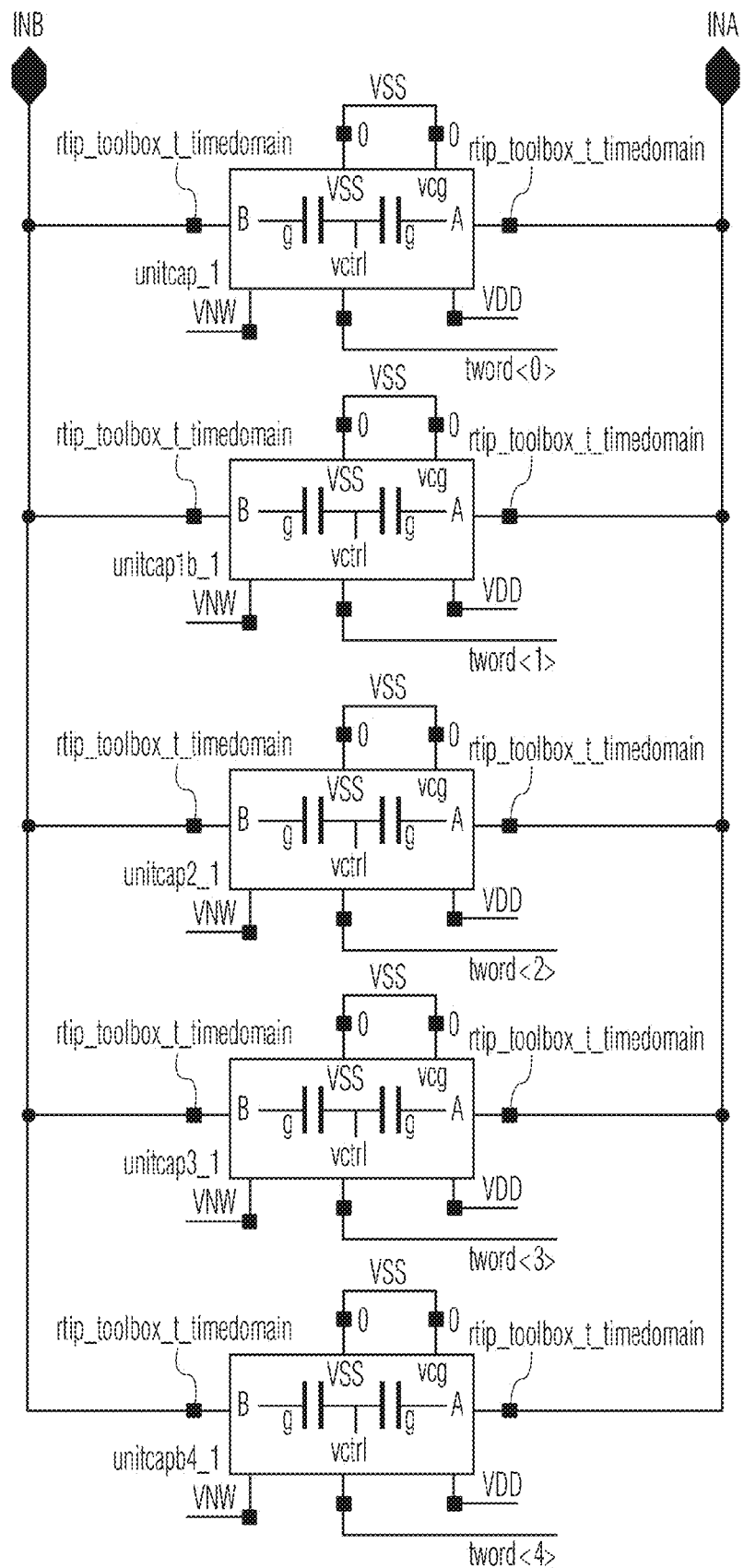
FIG. 7 shows example embodiments of a capacitor bank utilizing non-volatile switches, consistent with the instant disclosure.

FIG. 7 shows an example implementation of a circuit level diagram of a five-bit-capacitors bank using nMOS nonvolatile switches. The input capacitance of a tag can be tuned from 19.5 pF to 27.4 pF with steps of 255 fF.

Figure 8A:
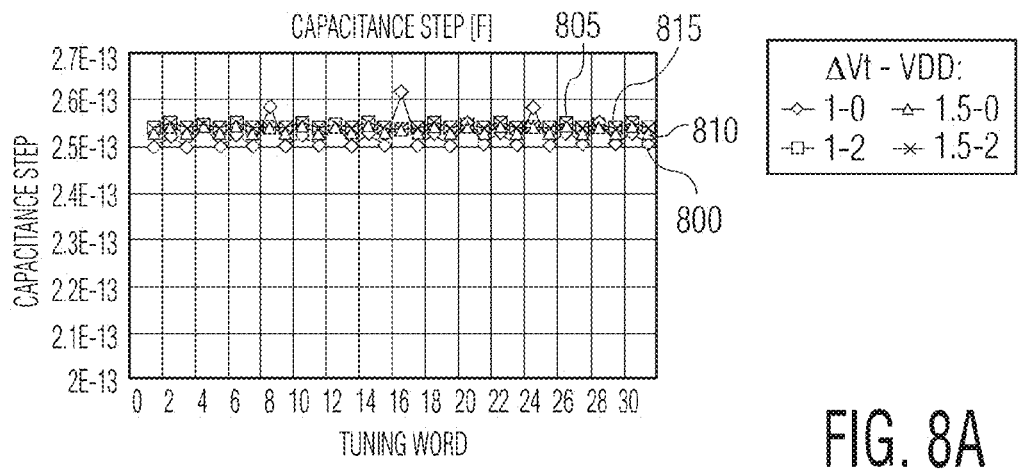
FIG. 8A shows a capacitor bank tuning steps, consistent with embodiments of the instant disclosure.
Figure 8B:
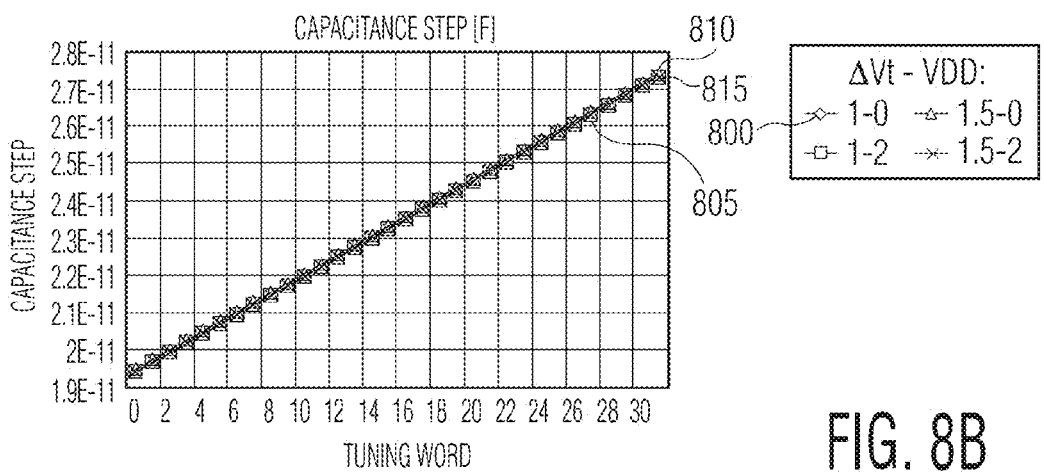
FIG. 8B shows a capacitor bank tuning range, consistent with embodiments of the instant disclosure.
Figure 8C:
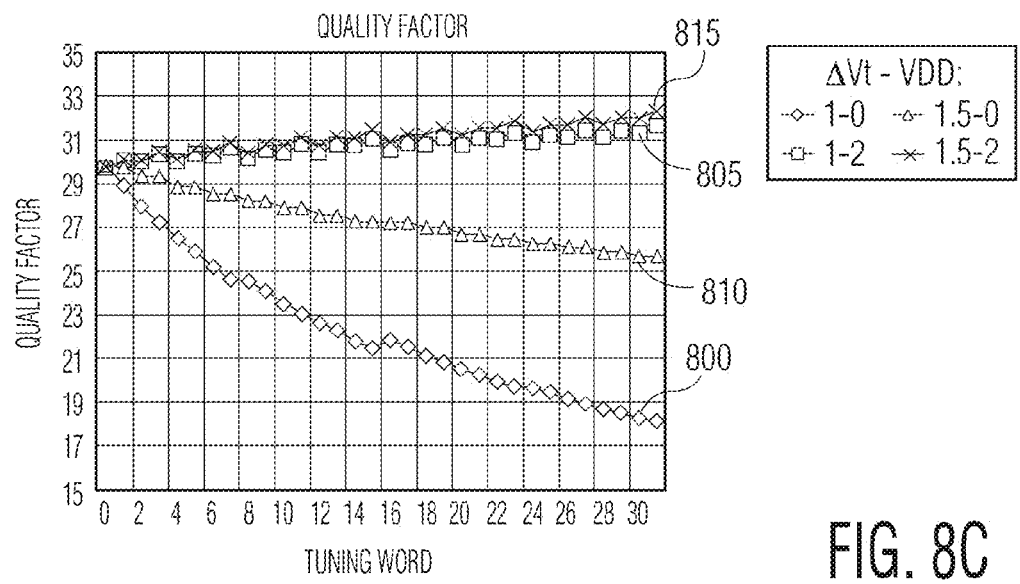
FIG. 8C shows a capacitor bank quality factor, consistent with embodiments of the instant disclosure.

FIG. 8A shows a capacitor bank tuning steps as a function of the tuning word for a capacitor bank such as shown in FIG. 7. FIG. 8A shows the capacitor bank tuning steps for various threshold shifts ($\Delta$VT) and low-dropout regulator output (VDD): $\Delta$VT=1 V, VDD=0 V (800); $\Delta$VT=1 V, VDD=2 V (805); $\Delta$VT=1.5 V, VDD=0 V (810); and $\Delta$VT=1.5 V, VDD=2 V (815). FIG. 8B shows the tuning range of the capacitors bank for various threshold shifts ($\Delta$VT) and low-dropout regulator output (VDD). The achieved quality factor of the tag is given in FIG. 8C for various threshold shifts ($\Delta$VT) and low-dropout regulator output (VDD). The quality factor at start-up (VDD=0) depends on the amount of the accommodated threshold reduction during the write phase. Using a threshold reduction of less than one volt, the achieved quality factor will be less than nineteen for tuning words beyond 28. In this case, the auxiliary charge pump might help to get the tag started. Once the tag has started (VDD=2V), the quality factor is no longer dependent on the threshold shift.

Figure 9:
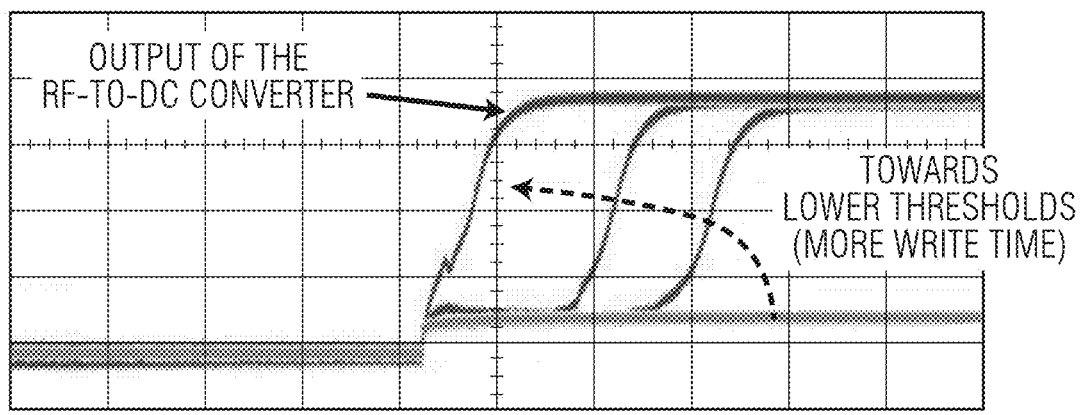
FIG. 9 shows an example of start-up behavior of an RF-to-DC rectifier and capacitor bank, consistent with example embodiments of the instant disclosure.

FIG. 9 shows the measured start-up behavior of the RF-to-DC rectifier and capacitors bank for different threshold shifts. With no threshold shift, the system fails to start up. The higher the threshold shift, the faster the start-up time becomes. The auxiliary charge pump is not needed when large threshold shifts can be made.

Figure 10:
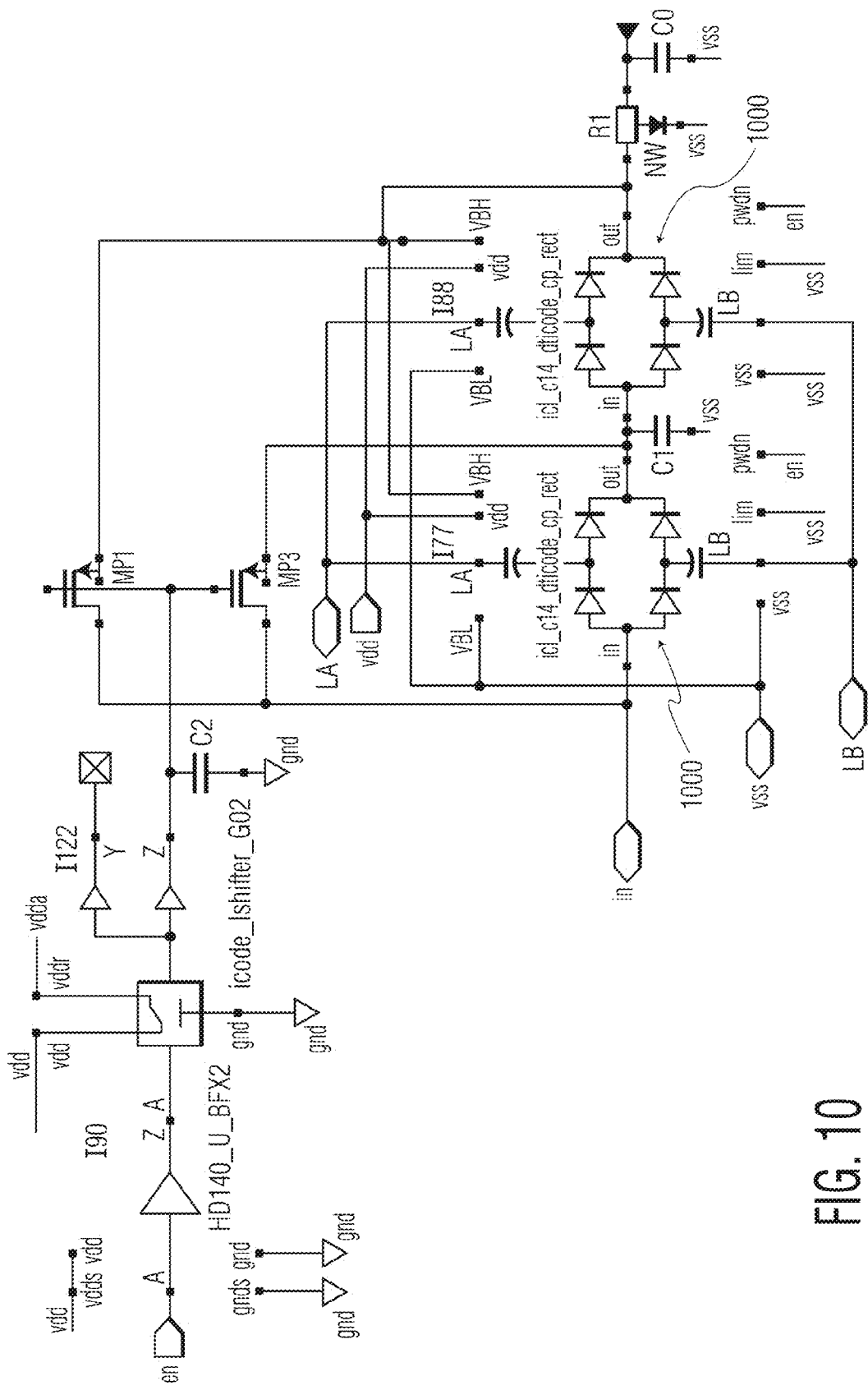
FIG. 10 shows a two-stage auxiliary pump, utilized in various embodiments of the instant disclosure.
Figure 11:
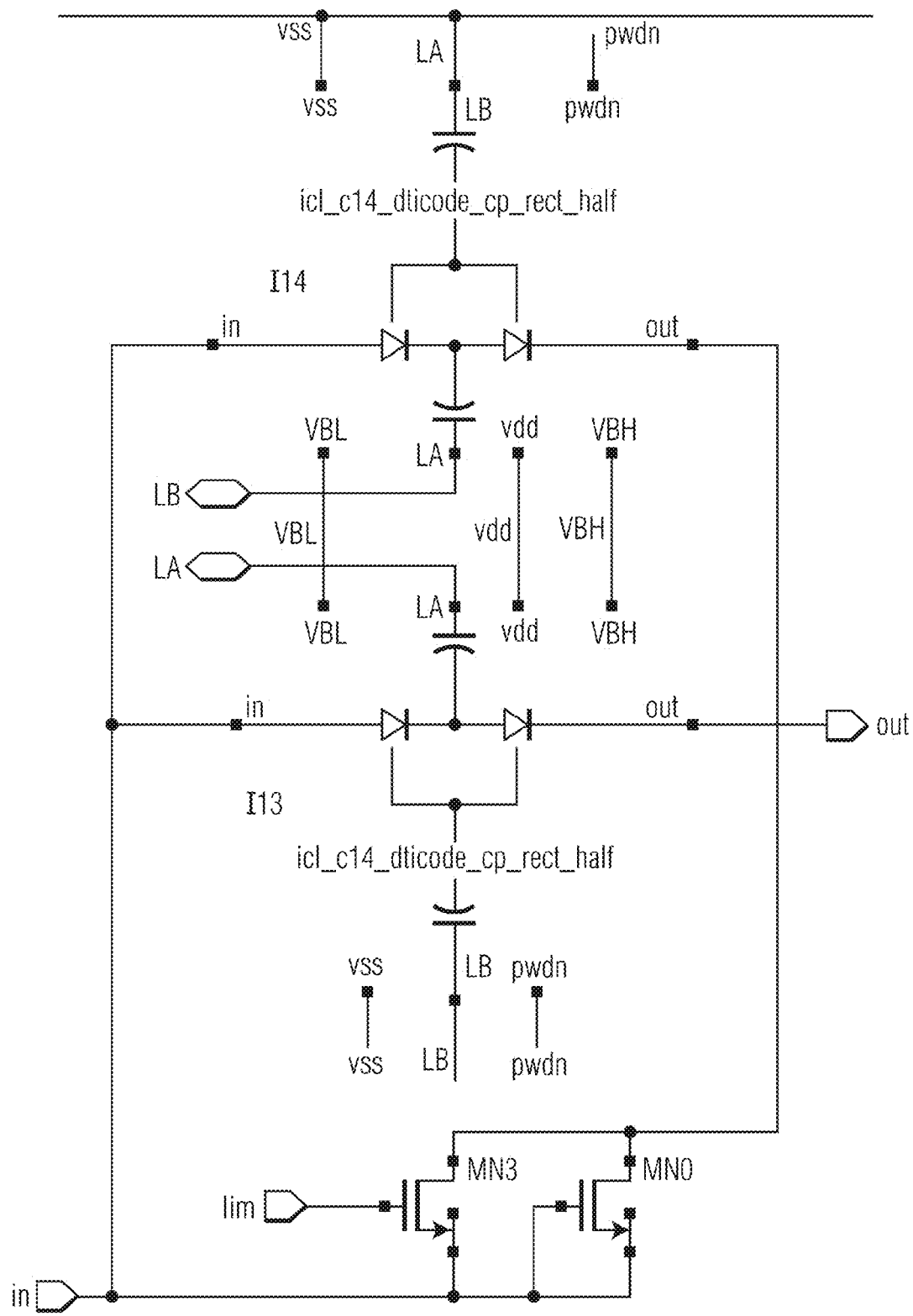
FIG. 11 shows a full-wave rectifier, utilized in various embodiments of the instant disclosure.
Figure 12:
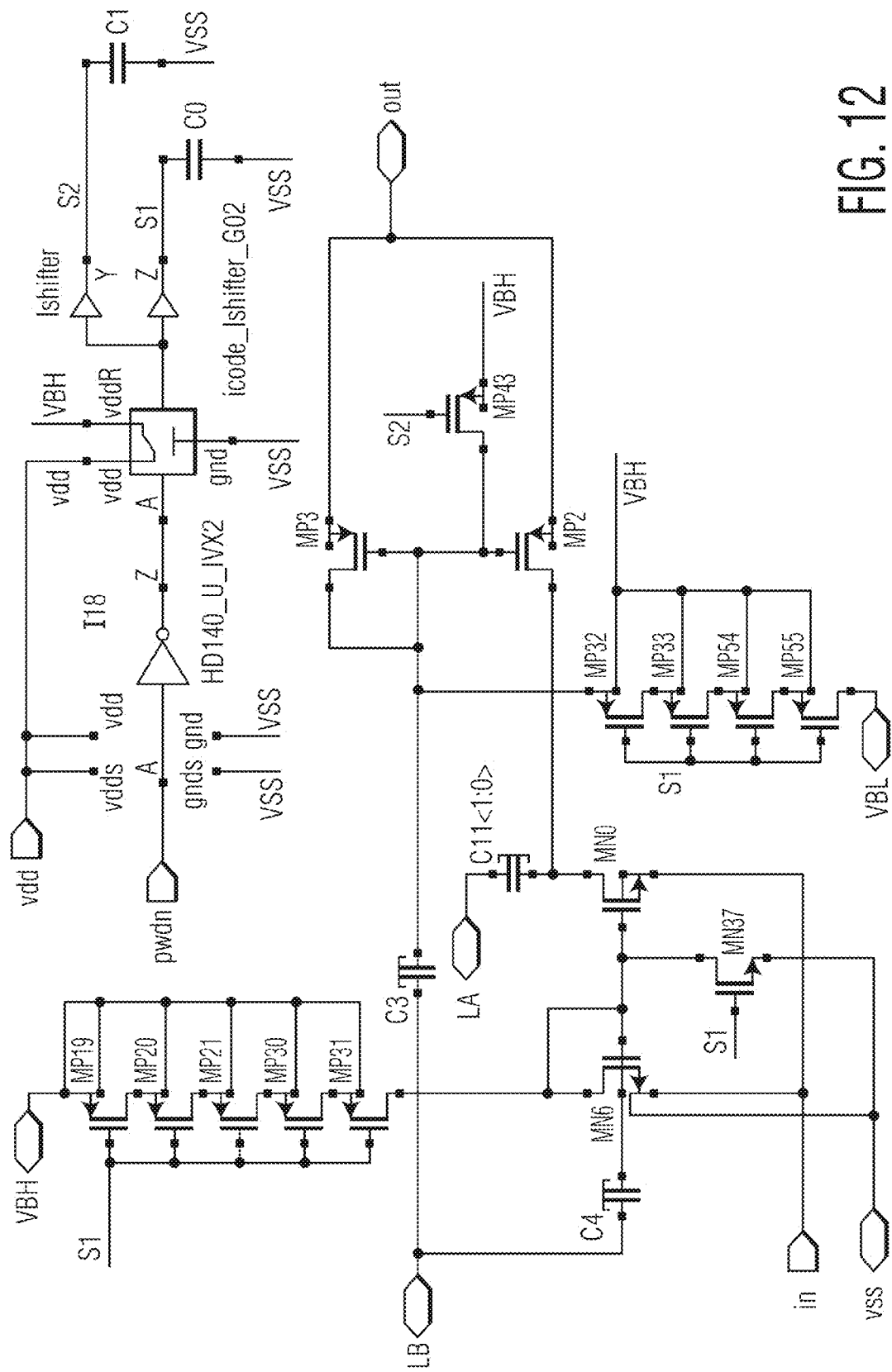
FIG. 12 shows a half-wave rectifier, utilized in various embodiments of the instant disclosure.

A schematic of an example auxiliary charge pump is shown in FIG. 10. It consists of two rectification stages 1000, which can be extended to include more stages. In the power down mode, the outputs of these stages are shorted to the input via the switches MP1 and MP3. Each rectification stage 1000 is a full wave rectifier and is shown in FIG. 11. The schematic of a half wave rectifier is shown in FIG. 12. The main rectifier, consisting of MN0 and MP2, is AC-coupled to the LA input. These rectifiers are pre-biased using MN6 and MP3. This rectifier can be put in power down mode using the pwdn pin. The power down mode is achieved by turning off the main rectifiers MN0 and MP2.

Low frequency (LF) applications in RFID apparatuses typically operate at 125 kHz, whereas high frequency (HF) applications typically operate at 13.56 MHz, and ultra high frequency (UHF) applications typically operate from 840 MHz to 960 MHz. The "read range" of an RFID tag and reader system is often defined as the distance from which a reader can communicate with a tag. Passive LF and HF applications offer read ranges from a couple of centimeters up to one meter, often requiring the RFID tag to be within that distance of a reader for successful communication. Passive UHF applications can offer longer read ranges, allowing RFID tags to be within two to twelve meters or more of a reader for successful communication.

In the case of UHF passive tags, a minimum bandwidth of 120 MHz is required to make these tags suitable for European, Japanese, and American market. This can result in a low quality factor. However, aspects of the instant disclosure extend the bandwidth of high quality factor UHF tags and improve the efficiency of the RF-to-DC converter, resulting in an improved read range.

Based upon the above discussion and illustrations, those skilled in the art will readily recognize that various modifications and changes may be made without strictly following the exemplary embodiments and applications illustrated and described herein. Furthermore, various features of the different embodiments may be implemented in various combinations. Such modifications do not depart from the true spirit and scope of the present disclosure, including those set forth in the following claims.

What is claimed is:

1. An RFID apparatus, comprising:
    an input circuit having an input impedance used for receiving RF signals;
    an RF-signal converter configured and arranged to provide an apparatus-operating power signal in response to receiving the RF signals;
    an impedance circuit configured and arranged to provide and select impedance values in response to at least one select signal;
    a state-machine logic circuit configured and arranged to provide said at least one select signal, in response to the apparatus-operating power signal, for selecting the impedance values and therein permit the input impedance to be changed for tuning the apparatus;
    an attenuator connected between the RF-signal converter and the state-machine logic circuit; and
    a charge pump circuit coupled in parallel with the attenuator and the impedance circuit, wherein the charge pump circuit is configured to assist the RF-signal converter in providing an apparatus-operating power signal in response to receiving the RF signals during a read mode of operating the RFID apparatus and configured to be turned off during a write mode of operating the RFID apparatus,
    wherein the impedance circuit includes a selectable capacitance circuit having a plurality of nonvolatile MOS-device switches in which unit capacitance is changed by increasing or decreasing a threshold voltage of at least one MOS device from the plurality of nonvolatile MOS-device switches.

2. The RFID apparatus of claim 1, wherein the input circuit, the RF-signal converter, the impedance circuit and the logic circuit are configured and arranged as part of a passive RFID tag apparatus.

3. The RFID apparatus of claim 1, wherein the impedance circuit includes a bank of capacitance circuits.

4. The RFID apparatus of claim 1, wherein the impedance circuit includes a bank of capacitance circuits, each capacitance circuit in the bank being configured and arranged to provide a capacitance value in response to at least one select signal.

5. The RFID apparatus of claim 1, wherein the impedance circuit includes a bank of unit-selectable capacitance circuits, each capacitance circuit in the bank being configured and arranged to provide a capacitance value in response to at least one select signal.

6. The RFID apparatus of claim 1, wherein the input impedance is a capacitance which is tuned to be independent of RF-modulation parameters.

7. The RFID apparatus of claim 1, wherein the impedance circuit includes a selectable impedance circuit having a plurality of nonvolatile switches.

8. The RFID apparatus of claim 1, wherein the impedance circuit is further configured and arranged for programming as a resonance capacitor during use of the RFID apparatus.

9. The RFID apparatus of claim 1, wherein the impedance circuit includes a bank of unit-selectable capacitance circuits configured and arranged to provide a default capacitance value from which the input impedance is changed to tune the apparatus.

10. The RFID apparatus of claim 1, wherein the logic circuit is configured and arranged to operate the state machine for a first mode in which a first voltage is applied to change a threshold voltage for changing an impedance value of a selectable circuit in the impedance circuit, and for another mode in which another voltage is applied for changing an impedance value in the impedance circuit.

11. The RFID apparatus of claim 1, wherein said at least one select signal includes a first signal and another signal, wherein the logic circuit is configured and arranged to operate the state machine for a first mode in which the first signal is applied, and for another mode in which another signal is applied.

12. The RFID apparatus of claim 1, wherein the state-machine logic circuit is configured to adjust the attenuator and a tuning word of the selectable capacitance circuit to improve power matching at the input circuit of the RFID apparatus tag.

13. The RFID apparatus of claim 12, wherein the RFID apparatus further comprises memory configured to store the tuning word of the selectable capacitance circuit, wherein the RFID apparatus is configured to change threshold voltages of non-volatile switches of the selectable capacitance circuit based on the tuning word.

14. The RFID apparatus of claim 1, further comprising:
a demultiplexer connected between the selectable capacitance circuit and the state-machine logic circuit; and
an oscillator circuit configured to provide an oscillation signal to the state-machine logic circuit.

15. The RFID apparatus of claim 14, further comprising:
a low-dropout regulator connected between the charge pump circuit and the state-machine logic circuit and configured to maintain an operating voltage for the RFID apparatus; and
a comparator configured to compare the output of the low-dropout regulator to a reference voltage.

16. An RFID apparatus having an input impedance which is susceptible to change due to environmentally-based impedance influences, the apparatus comprising:
an input circuit having an input impedance used for receiving RF signals;
an RF-signal converter configured and arranged to provide an apparatus-operating power signal in response to receiving the RF signals;
a capacitance circuit configured and arranged to provide and select capacitance values in response to at least one select signal;
a state-machine logic circuit configured and arranged to provide said at least one select signal, in response to the apparatus-operating power signal, for selecting the impedance values, and therein permitting the input impedance to be changed by tuning the apparatus in order to compensate for the environmentally-based impedance influences;
an attenuator connected between the RF-signal converter and the state-machine logic circuit; and
a charge pump circuit coupled in parallel with the attenuator and the capacitance circuit, wherein the charge pump circuit is configured to assist the RF-signal converter in providing an apparatus-operating power signal in response to receiving the RF signals during a read mode of operating the RFID apparatus and configured to be turned off during a write mode of operating the RFID apparatus,
wherein the capacitance circuit includes a selectable capacitance circuit having a plurality of nonvolatile MOS-device switches in which unit capacitance is changed by increasing or decreasing a threshold voltage of at least one MOS device from the plurality of nonvolatile MOS-device switches.

17. The apparatus of claim 16, wherein the capacitance circuit includes a bank of capacitors, each capacitor being configured and arranged to provide a capacitance value in response to at least one select signal.

18. The apparatus of claim 16, wherein the capacitance circuit is further configured and arranged to provide a default capacitance value from which the input impedance is changed to tune the apparatus.

19. A method comprising:
providing an RFID circuit with an input circuit having an input impedance used for receiving RF signals, and with an RF-signal converter for providing operating power in response to receiving the RF signals;
using an impedance circuit to provide and select impedance values in response to at least one select signal;
using a state-machine logic circuit, responsive to the RF-signal converter by providing operating power during a start-up mode, to generate at least one select signal that selects the impedance values to change the input impedance, and thereby tuning the apparatus;
performing signal attenuation using an attenuator connected between the RF-signal converter and the state-machine logic circuit; and
assisting the RF-signal converter by using a charge pump circuit coupled in parallel with the attenuator and the impedance circuit in providing an apparatus-operating power signal in response to receiving the RF signals during a read mode of operating an RFID apparatus and turning off the charge pump circuit during a write mode of operating the RFID apparatus,
wherein using the impedance circuit to provide and select the impedance values comprises changing unit capacitance using a selectable capacitance circuit of the impedance circuit having a plurality of nonvolatile MOS-device switches by increasing or decreasing a threshold voltage of at least one MOS device from the plurality of nonvolatile MOS-device switches.

* * * * *